T. C. CRAVEN.

Cotton-Gin Saws.

No. 5,229. Reissued Jan. 14, 1873.

Witnesses.
R. T. Campbell.
J. H. Campbell.

Inventor
Thos. C. Craven -
Barton H. Jenks
Assignee
by
Munn, Pennie & Lawrence
Agts.

AM. PHOTO-LITHOGRAPHIC CO. N.Y. (OSBORNE'S PROCESS.)

UNITED STATES PATENT OFFICE.

THOMAS C. CRAVEN, OF NORTHAMPTON, MASSACHUSETTS, ASSIGNOR TO BARTON H. JENKS, OF PHILADELPHIA, PENNSYLVANIA.

IMPROVEMENT IN COTTON-GIN SAWS.

Specification forming part of Letters Patent No. 115,441, dated May 30, 1871; reissue No. 5,229, dated January 14, 1873.

*To all whom it may concern:*

Be it known that I, THOMAS COWELL CRAVEN, formerly of the city and county of Philadelphia and State of Pennsylvania, but now of Northampton, Massachusetts, have invented a new and useful Improvement in Cotton-Gin Saws; and I do hereby declare that the following is a full, clear, and exact description thereof, reference being had to the accompanying drawing making part of this specification, in which—

Figure 1:
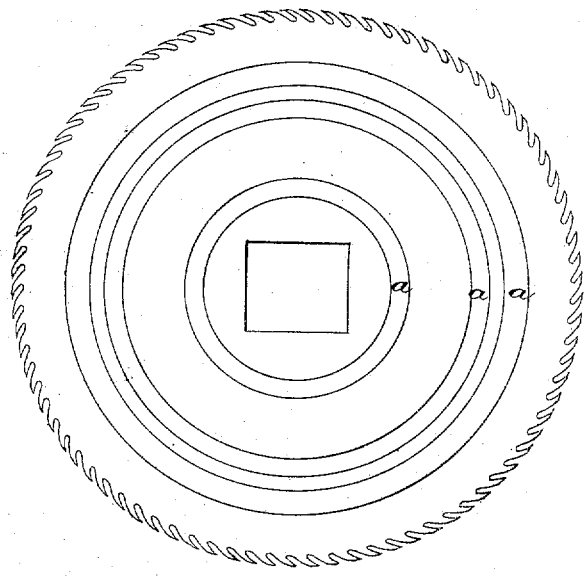
Figure 2:
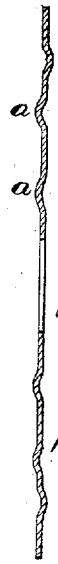

Figure 1 is a face view of one form of my improved blade. Fig. 2 is a diametrical section through this form of blade.

Similar letters of reference indicate corresponding parts in the several figures.

It is desirable that a greater stiffness and straightness be given to the blade than can be obtained by the usual hammering process. Efforts have been made to flatten saw-blades by pressing them between heated dies. Such saws require to be first heated and hardened, after which they are placed between the heated dies and pressure gradually applied, thus simultaneously drawing the temper, and to a certain extent flattening the blade, after which the saw passes through the usual process of hand hammering. They are then ground and rehammered. Saws so made are used for sawing wood, metals, and stone, and are much thicker than cotton-gin saws.

It has been found in practice that "gage twenty-one" is the best thickness for cotton-gin saws, and of that gage they are generally made. As a rule, the thinner the blades the more they will "gin" in a given time. Cotton-gin saws are not "tempered." Were they heated they would "scale," rendering grinding of them necessary, which is not practicable on account of their thinness.

Heretofore the saws of cotton-gins, being, as is necessary, very thin, would be crowded by the cotton until they would strike or rub against the rib or grating of the gin, causing a jamming, spinning process, upon the cotton being ginned, and thus creating the "nip," so troublesome to the cotton-spinner, besides cutting the fiber and creating "fly."

My invention consists of stiffening and straightening cotton-gin saws, by pressing and upsetting the saw-plate into corrugations while the plate is in a cold state, by means of dies, this mode of treating the plate serving not only to stiffen and straighten it, but also to harden the teeth.

The corrugations shown at *a a* are annular, which I prefer, on account of the cheapness with which the dies can be made on a common lathe; but the same result would be attained were the corrugations arranged radial, curvilinear, or otherwise.

What I claim as new, and desire to secure by Letters Patent, is—

1. A saw for cotton-gins, stiffened or straightened by corrugating, as and for the purpose set forth.

2. A corrugated cotton-gin saw as a new article of manufacture.

THOMAS COWELL CRAVEN.

Witnesses:

JAMES W. BURKE,

JOHN EICHNER.